United States Patent [19]

Atkinson et al.

[11] Patent Number: 5,195,855

[45] Date of Patent: Mar. 23, 1993

[54] BLIND RIVET

[75] Inventors: Alan W. Atkinson, Rugby; Melanie J. Walsh, Braunston; David Cater, Birmingham, all of England

[73] Assignee: The Bentley-Harris Manufacturing Company, Lionville, Pa.

[21] Appl. No.: 868,541

[22] Filed: Apr. 14, 1992

[30] Foreign Application Priority Data

May 3, 1991 [GB] United Kingdom ............... 9109604

[51] Int. Cl.$^5$ ............................................. F16B 13/04
[52] U.S. Cl. ........................................ 411/43; 411/501
[58] Field of Search ............... 411/501, 43, 34, 70, 411/39, 41

[56] References Cited

U.S. PATENT DOCUMENTS

| | | | |
|---|---|---|---|
| 2,293,894 | 8/1942 | Fether | 411/501 X |
| 2,759,082 | 8/1956 | Rea | 411/43 X |
| 3,477,336 | 11/1969 | Thorpe | 411/29 |
| 4,211,145 | 7/1980 | Dolch | 411/43 |

FOREIGN PATENT DOCUMENTS

| | | | |
|---|---|---|---|
| 382638 | 8/1990 | European Pat. Off. | 411/43 |
| 2519393 | 7/1983 | France | 411/34 |
| 1552235 | 9/1979 | United Kingdom | 411/43 |

*Primary Examiner*—Rodney M. Lindsey
*Attorney, Agent, or Firm*—Synnestvedt & Lechner

[57] ABSTRACT

A blind rivet (10) comprises a head (12), a shank (14) made at least partially of heat-softenable polymeric material, and force transmitting means (22, 24) operable to apply force to a portion (14a) of the shank (14) to cause it to deform to form a further head (30) opposed to the first-mentioned head (12). The rivet also comprises electrical heating means (26) arranged to be supplied with electrical current through the first-mentioned head (12) and operable to heat the deformable portion (14a) of the shank (14).

9 Claims, 2 Drawing Sheets

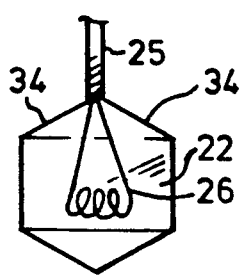
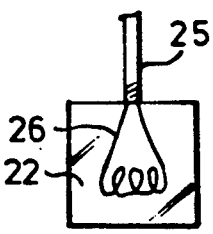
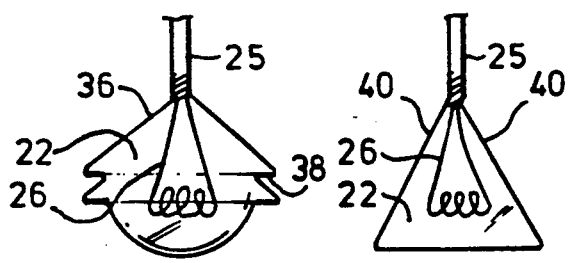
FIG.4　　　FIG.5　　　FIG.6　　　FIG.7
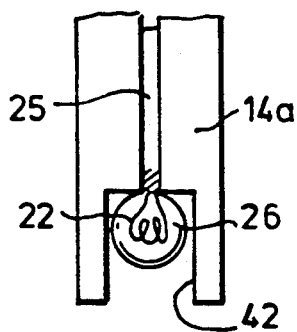
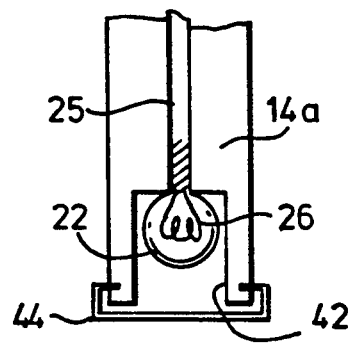
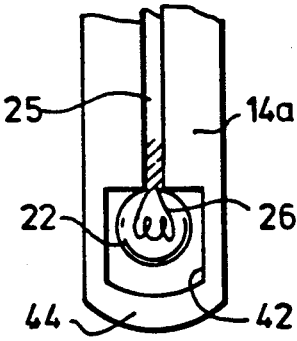
FIG.8　　　FIG.9　　　FIG.10
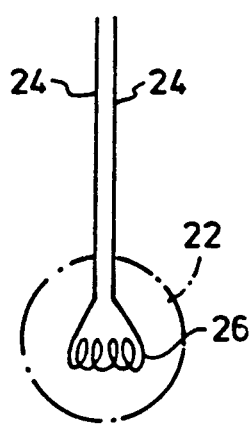
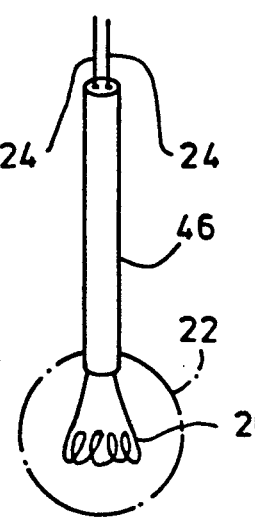
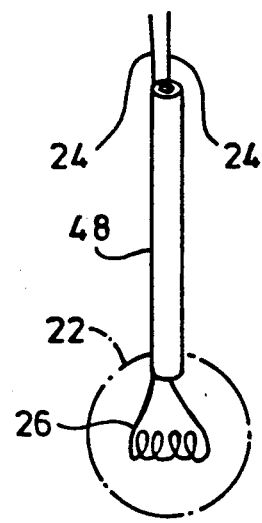
FIG.11　　　FIG.12　　　FIG.13

BLIND RIVET

BACKGROUND TO THE INVENTION

This invention is concerned with blind rivets.

Blind rivets are used in circumstances where access to both sides of materials to be joined is difficult or impossible. Such rivets comprise a rivet head, a shank projecting from one side of the rivet head, and force transmitting means which projects from an opposite side of the rivet head, extends through the rivet head and along the shank, and engages a portion of the shank. The force transmitting means is used, once the shank has been inserted through holes in two workpieces to be joined by the rivet and when the rivet head is held stationary against the first of the workpieces, to transmit force applied thereto on said opposite side of the rivet head, so that the force is applied to said portion of the shank. The force transmitted causes said portion of the shank to deform to form a further rivet head, which engages the second of the workpieces, thereby forming the completed rivet.

Most blind rivets are made of metal and their force transmitting means comprises a mandrel having a mandrel head, providing an anvil member to apply the force, and a stem connected to the mandrel head. The stem passes through a bore through the rivet head and the shank of the rivet. A line of the weakness is provided in the mandrel stem adjacent to the mandrel head allowing it to break off once the further rivet head has been formed. For example, blind rivets can be used to join the panels of an aircraft skin to the structural members of the aircraft. Where such blind rivets are made of metal, their performance is generally adequate, when joining metal workpieces. However, the use of metal blind rivets to join other materials can lead to problems. For example, composite materials made at least partially from polymeric materials, e.g. polyetheretherketone or polyphenylene sulphide filled with carbon fibre, are finding an increasing number of uses because of their strength and lightness. If metal blind rivets are used to join such materials, there is a thermal expansion mismatch between the material joined and the rivet with implications for tightness of the joint, in some cases a corrosion problem arises, and the presence of the metal increases the overall weight of the joined structure. For these reasons, such materials are normally secured by adhesive. However, such adhesively bonded joints generally fail prior to failure of the structural components which is contrary to design criteria of the aircraft industry, for example. Therefore, a requirement exits for a satisfactory blind rivet made a least partially of a polymeric material, such as a composite material of the type referred to above.

Blind rivets which are made of polymeric material, however, have shanks which are lacking in ductility when cold. This means that sufficient force cannot be transmitted by conventional means to the shank to form said further head.

It has been proposed for the portion of the shank to be deformed to comprise only partially cross-linked thermosetting polymeric material which is heated after insertion of the rivet by applying heat to a conventional mandrel (see U.S. Pat. No. 4,478,544). The material of the shank is softened by the heat and becomes sufficiently ductile to allow the further rivet head to be formed. Continued application of force and heat causes the material to crosslink so that the further rivet head retains its shape. This proposal is disadvantageous in that a not fully polymerised material may have to be stored in refrigerated conditions for considerable periods before use and the heat is also applied in an inefficient and uncontrolled manner.

It is an object of the present invention to provide a blind rivet having a shank made at least partially of heat-softenable polymeric material, the rivet having heating means for softening the shank material to allow formation of a further rivet head in an efficient and controllable manner while the rivet is in situ.

BRIEF SUMMARY OF THE INVENTION

The invention provides a blind rivet comprising a rivet head, a shank made at least partially of heat-softenable polymeric material projecting from one side of the rivet head, and force transmitting means which projects from an opposite side of the rivet head, extends through the rivet head and along the shank, and engages a portion of the shank, the force transmitting means being arranged, when the rivet head is held stationary, to transmit force applied thereto on said opposite side of the rivet head so that the force is applied to said portion of the shank to cause said portion to deform to form a further rivet head opposed to the first-mentioned rivet head, the force transmitting means comprising an anvil member engaging said portion of the shank, and pulling means passing through the rivet head and along the shank, the pulling means being connected to the anvil member, wherein the anvil member is made of an electrically insulating material, and the blind rivet also comprises an electrical resistance heater embedded in the anvil member and arranged to be supplied with electrical current through the first-mentioned rivet head, the heater being operable to heat the anvil member from which heat is conducted to said portion of the shank.

In a blind rivet according to the invention, the electrical heater can be operated while the rivet is in situ to apply heat where it is required in a controllable and efficient manner. The heat enables the further rivet head to be formed effectively.

The heat-softenable polymeric material may be a thermoplastic material, such as polyetheretherketone or polyphenylene sulphide. The thermoplastic material may be reinforced with fibers, e.g., it may be filled with carbon fiber up to 40 or 60% by volume, so that the material is strong and stiff but can be deformed under the influence of heat and pressure.

The anvil member may be made of glass, ceramic material, a polymeric material having a higher deformation temperature than the material of the rivet shank, or a high temperature cement. The electrical heater may comprise a coil, embedded in the anvil member. With certain materials, it is possible to continue to apply heat after the further rivet head has been formed so that the anvil member softens and allows the resistance member to be withdrawn from the rivet.

In the interests of easier head formation, the anvil member may be provided with at least one wedging surface operable to assist in spreading the material of the shank portion.

As it may be essential to retain the anvil member after formation of the further head, the anvil member may be provided with locking means for this purpose. Furthermore, in the interests of better head formation, the anvil member may be contained in a recess in the tip of the shank, this recess may be bridged by a bridging member.

Conveniently, the pulling means comprises two electrical conductors along which electrical current is also supplied to the electrical heater. The electrical conductors may comprise wires, e.g. of nickel-chromium. The two wires may be connected to a coil of the same material embedded in the anvil member, the coil providing the electrical heater.

The deformable portion of the shank may be made of a thermoplastic material having a glass transition temperature of at least 80° centigrade, and a melting temperature of at least 150° centigrade, e.g. such a thermoplastic material reinforced with carbon fibres.

BRIEF DESCRIPTION OF THE DRAWINGS

There now follows a detailed description, to be read with reference to the accompanying drawings, of examples of blind rivets in accordance with the invention.

In the drawings:

FIG. 1 showing the rivet before formation of its further rivet head, FIG. 2 in an intermediate condition, and FIG. 3 in a final condition;

FIGS. 4 to 7 are cross-sectional views on a larger scale than FIG. 1 of anvil members for use in substitution for the anvil member shown in FIGS. 1 to 3;

FIGS. 8 to 10 are cross-sectional views of the end of shanks of alternative blind rivets to that shown in FIGS. 1 to 3; and FIGS. 11 to 13 are diagrammatic views of alternative pulling means for use with the rivet shown in FIGS. 1 to 3 or FIGS. 8 to 10.

DETAILED DESCRIPTION OF PREFERRED EMBODIMENTS OF THE INVENTION

Figure 1:
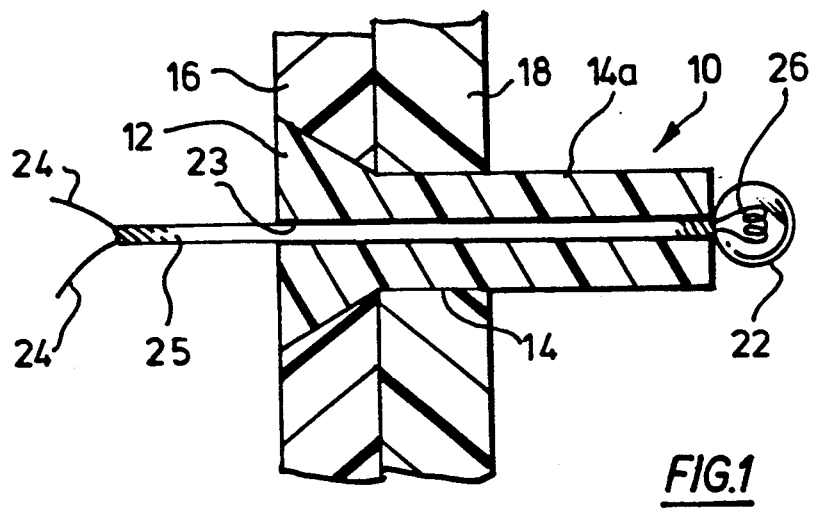
FIGS. 1, 2 and 3 are cross-sectional views through a blind rivet in accordance with the invention.
Figure 2:
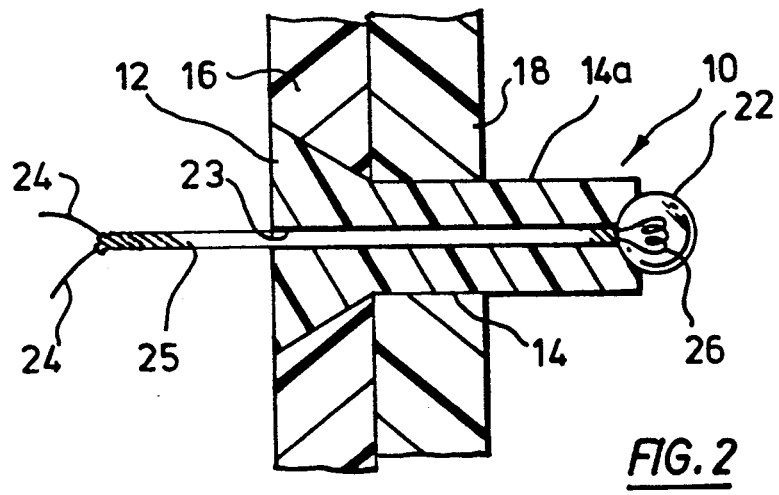
Figure 3:
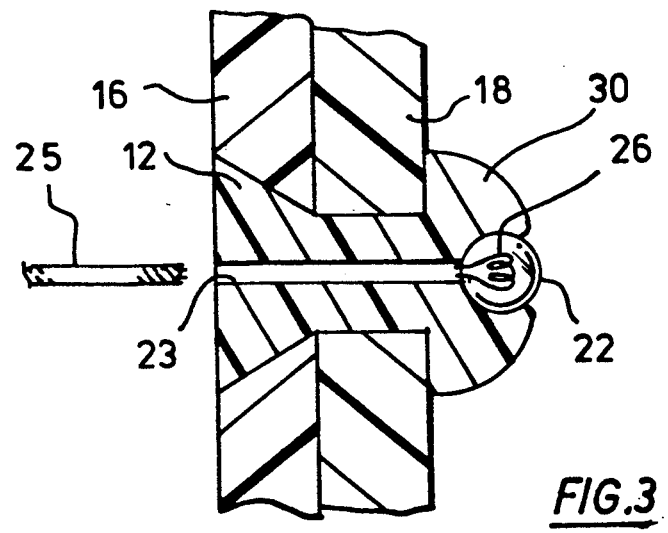

FIGS. 1 to 3 of the drawings show a blind rivet 10 made of heat-softenable polymeric material reinforced with fibres. The rivet 10 comprises a rivet head 12 and a shank 14 projecting from one side of the rivet head 12. The rivet 10 is inserted into aligned holes through two panels 16 and 18 made of composite material which are to be joined together by the rivet 10, the rivet head 12 being countersunk into the panel 16. When the rivet 10 is inserted into the holes as shown in FIG. 1, the rivet head 12 abuts the panel 16, and a portion 14a of the shank 14 projects beyond the panel 18 The rivet head 12 and the shank 14 are integrally formed. The polymeric material may be polyetheretherketone or polyphenylene sulphide filled with carbon fibre up to 40 or 60% by volume. The material is, thus, strong and stiff but can be deformed under the influence of heat and pressure.

The shank portion 14a remote from the rivet head 12 which projects beyond the panel 18 is deformable to form a further rivet head 30 (see FIG. 3) opposed to the rivet head 12. To cause this deformation, the rivet 10 comprises force transmitting means which projects from the opposite side of the rivet head 12 to the shank 14, extends through the rivet head 12 and along the shank 14 in a central longitudinal bore 23, and engages the portion 14a of the shank at the end thereof. The force transmitting means is arranged, when the rivet head 12 is held stationary, to transmit force applied thereto on said opposite side of the rivet head 12 so that the force is applied to the portion 14a of the shank to cause it to deform to form the further head 30. The force transmitting means comprises an anvil member 22 made of an electrically insulating material which engages the deformable portion 14a at the end thereof and is movable towards the head 12 to cause the formation of the further rivet head 30. The anvil member 22 is in the form of a glass bead, e.g. of Pyrex or quartz glass, and, in this case, is spherical. Before the formation of the further rivet head 30, the anvil member 22 rests against a flat end of the shank portion 14a.

The force transmitting means also comprises pulling means passing through the rivet head 12 and along the shank 14 and connected to the anvil member 22 so that, by pulling the pulling means, movement of the anvil member 22 towards the rivet head 12 can be caused, when the rivet head 12 is held stationary against movement in that direction. The pulling means is provided by two wires 24. Each wire 24 is made of nickel-chromium and extends from a position further from the panel 16 than the rivet head 12, through the bore 23, through the rivet head 12 and the shank 14, to the anvil member 22. The wires 24 are each covered with an insulating coating and are twisted together into a cord 25 before entering the rivet head 12. The wires 24 are, therefore, electrically insulated from one another.

The rivet 10 also comprises electrical heating means arranged to be supplied with electrical current through the rivet head 12 along the wires 24 and operable to heat the portion of the shank 14a by conduction from the anvil member 22 which the heating means heats directly. This heating means comprises a resistance member in the form of a coil 26 embedded in the member 22 and connected at its ends to the wires 24 which, in addition to providing the aforementioned pulling means which is connected to the anvil member 22, also form electrical conducting means passing through the rivet head 12 and the shank 14 and operable to supply current to the coil 26.

To install the blind rivet 10, it is inserted into the holes in the panels 16 and 18 (as shown in FIG. 1). The wires 24 are then connected to a source of electrical energy (not shown) so that the coil 26 is supplied with current and heats the anvil member 22 from which heat is conducted to the shank portion 14a. For example, 5 amps may be supplied for about 7 seconds from a 6 volt d.c. supply. The cord 25 is gripped by a setting tool (not shown) operable to pull the cord 25 (to the left viewing FIGS. 1 to 3) while holding the rivet head 12 stationary against the panel 16. The tool is generally of the type used for setting conventional metal blind rivets but modified to allow for the electrical connections to the wires 24. When the tool is operated, the anvil member 22 initially melts its way into the shank portion 14a slightly, as shown in FIG. 2, and then causes the shank portion 14a to deform to form the further rivet head 30 opposed to the rivet head 12 and on the opposite side of the panels 16 and 18 to the rivet head 12. Once the further rivet head 30 has been formed, the electrical current is turned off to allow the further rivet head 30 to cool and solidify, then a further operation of the tool causes the wires 24 to break at a point of weakness (not shown) provided adjacent to the coil 26 so that the cord 25 can be withdrawn from the bore 23 (this condition is shown in FIG. 3.)

FIGS. 4 to 7 show alternative shapes for the anvil member 22. In FIG. 4, the anvil member 2 is hexagonal in cross-section with two wedging surfaces 34 meeting an at angle of 120° at the point at which the cord 25 enters the member 22. The surfaces 34 assist spreading the material of the shank portion 14a during setting of the rivet 10.

In FIG. 5, the anvil member 22 has a cubic shape which allows the setting force to be distributed over a greater area.

In FIG. 6, the anvil member has a conical wedging surface 36 which extends around the entry of the cord 25 into the member 22. The surface 36 assists in spreading the material of the shank portion 14a during setting of the rivet 10. An annular groove 38 extends around the member 22 and provides locking means for retaining the anvil member 22 after formation of the further rivet head since the material of the shank portion 14a can enter this groove 38 during formation of the further rivet head 30.

In FIG. 7, the anvil member 22 has a conical shape with a wedging surface 40.

FIGS. 8 to 10 show alternative tips for the shank portion 14a designed to give the further rivet head a neater appearance by preventing fraying of the material. In all three cases, the anvil member 22 (shown spherical) is contained in a cylindrical recess 42 in the tip so that the extreme end of the shank portion 14a is not deformed by pressure from the anvil member 22 during forming of the further rivet head. In FIGS. 9 and 10, bridging members 44 bridge recess 42 at the extreme end of the shank portion 14a to reduce the possibility of its deformation during setting. In FIG. 9 the member 44 is a sheet metal cap, and, in FIG. 10 it is an integral portion of the shank 14.

FIGS. 11 to 14 show alternatives to the cord 25. In FIG. 11, the wires 24 remain separate rather than being twisted into a cord but are still insulated by insulating coatings (not shown). In FIG. 12, the wires 24 are insulated by a ceramic cylinder 46 which is inserted into the bore 23 and can be withdrawn after formation of the further rivet head 30, the wires 24 being in individual bores through the cylinder 46. In FIG. 13, the portion of one of the wires 24 which occupies the bore 23 is replaced by a metal cylinder 48 and the other wire 24 extends centrally through this cylinder.

It will be understood that the variations shown in FIGS. 4 to 13 can be utilised in many permutations. Thus, for example, the anvil member of FIG. 6 can be positioned in a recess 42 as shown in FIG. 8 and its coil can be supplied with electrical energy through wires of the form shown in FIG. 13.

We claim:

1. A blind rivet comprising a rivet head, a shank made at least partially of heat-softenable polymeric material projecting from one side of the rivet head, and force transmitting means which projects from an opposite side of the rivet head, extends through the rivet head and along the shank, and engages a portion of the shank, the force transmitting means being arranged, when the rivet head is held stationary, to transmit force applied thereto on said opposite side of the rivet head so that the force is applied to said portion of the shank to cause said portion to deform to form a further rivet head opposed to the first-mentioned rivet head, transmitting means comprising an anvil member engaging said portion of the shank, and pulling means passing through the rivet head and along the shank, the pulling means being connected to the anvil member, wherein the anvil member is made of an electrically insulating material and the blind rivet also comprises an electrical resistance heater embedded in the anvil member and arranged to be supplied with electrical current through the first-mentioned rivet head, the heater being operable to heat the anvil member from which heat is conducted to heat said portion of the shank.

2. A blind rivet according to claim 1, wherein the anvil member is contained in a recess in the tip of the shank.

3. A blind rivet according to claim 2, wherein the recess in the shank is bridged by a bridging member.

4. A blind rivet according to claim 1, wherein the anvil member is made of glass.

5. A blind rivet according to claim 1, wherein the anvil member is made of a ceramic material.

6. A blind rivet according to claim 1, wherein the anvil member is made of a polymeric material having a higher deformation temperature than the material of the rivet shank.

7. A blind rivet according to claim 1, wherein the anvil member is provided with at least one wedging surface operable to assist in spreading the material of the shank portion.

8. A blind rivet according to claim 1, wherein the anvil member is provided with locking means for retaining the anvil member after formation of the further head.

9. A blind rivet according to claim 1, wherein the pulling means comprises two electrical conductors along which electrical current is supplied to the electrical heating means.

* * * * *